US009083599B2

(12) United States Patent
Huuhtanen et al.

(10) Patent No.: US 9,083,599 B2
(45) Date of Patent: Jul. 14, 2015

(54) METHOD, SYSTEM AND COMPUTER PROGRAM PRODUCT FOR PROVIDING ACCESS POLICIES FOR SERVICES

(75) Inventors: Jarkko Huuhtanen, Helsinki (FI); Santeri Jussila, Helsinki (FI)

(73) Assignee: Comptel Corporation, Helsinki (FI)

( * ) Notice: Subject to any disclaimer, the term of this patent is extended or adjusted under 35 U.S.C. 154(b) by 1527 days.

(21) Appl. No.: 11/795,625

(22) PCT Filed: Feb. 8, 2006

(86) PCT No.: PCT/FI2006/000039
§ 371 (c)(1),
(2), (4) Date: Jul. 19, 2007

(87) PCT Pub. No.: WO2006/084944
PCT Pub. Date: Aug. 17, 2006

(65) Prior Publication Data
US 2008/0216157 A1 Sep. 4, 2008

Related U.S. Application Data

(60) Provisional application No. 60/651,632, filed on Feb. 11, 2005, provisional application No. 60/652,741, filed on Feb. 15, 2005.

(30) Foreign Application Priority Data

Feb. 11, 2005 (EP) ..................................... 05396006

(51) Int. Cl.
*H04L 9/32* (2006.01)
*H04L 12/26* (2006.01)
(Continued)

(52) U.S. Cl.
CPC ............... *H04L 43/00* (2013.01); *G06F 9/465* (2013.01); *H04L 12/2602* (2013.01); *H04L 41/0806* (2013.01); *H04L 41/0863* (2013.01); *H04L 63/0263* (2013.01); *H04L 63/20* (2013.01)

(58) Field of Classification Search
CPC . H04L 63/20; H04L 63/0263; H04L 41/0806; H04L 41/0863; H04L 43/00; H04L 12/2602; G06F 9/465
USPC ....................................... 713/155–159; 726/4
See application file for complete search history.

(56) References Cited

U.S. PATENT DOCUMENTS

2003/0028624 A1 2/2003 Hasan et al.
(Continued)

FOREIGN PATENT DOCUMENTS

| WO | WO-00/78004 A | 12/2000 | |
|---|---|---|---|
| WO | WO 01/80589 A1 * | 10/2001 | ............... H04Q 7/38 |
| WO | WO-03/107224 A | 12/2003 | |

OTHER PUBLICATIONS

Karjoth et al., "The Authorization Service of Tivoli Policy Director," Comptuer Security Applications Conference, ACSAC 2001, Proceedings 17th Annual, 2001, pp. 319-328, XP010584914, ISBN: 0-7695-1405-7.
(Continued)

*Primary Examiner* — Joseph P Hirl
*Assistant Examiner* — Thomas Gyorfi
(74) *Attorney, Agent, or Firm* — Birch, Stewart, Kolasch & Birch, LLP

(57) ABSTRACT

The invention relates to a method, system and computer program product for provisioning in a communications network. According to the method at least one request is received form a client system (11, 30) through an Application Program Interface (API, 12, 13) and Management User Interface (48, 49, 58, 59, 93) for defining measures relating to customers and/or services and/or network elements (18, 19, 20, 21, 72), each request is processed in functional layers (80, 81, 82, 83) of the provisioning system hosted by network operator (1, 2). Tasks are executed according to the results of the processing step, and the results are reported to the requesting entity. According to the invention service operators (3, 4) are allowed to use the provisioning system (15) through authenticated Application Program Interface (API, 40, 50) and authorization function (43, 53) after the provisioning rules processing (94) where the rights for the use of the network elements (18, 19, 20, 21, 72) are controlled by the network operator, whereby the network operator is able to present and utilize one physical network in many logical views, each representing the portion accessible for virtual operator, and in this way controllable by network operator with limitations, authentication and authorization rules.

19 Claims, 3 Drawing Sheets

(51) Int. Cl.
  *G06F 9/46* (2006.01)
  *H04L 12/24* (2006.01)
  *H04L 29/06* (2006.01)

(56) References Cited

U.S. PATENT DOCUMENTS

2003/0110262 A1  6/2003  Hasan et al.
2005/0021598 A1*  1/2005  Dunlop et al. ............... 709/202
2006/0075102 A1*  4/2006  Cupit ........................... 709/225
2007/0203799 A1*  8/2007  Caballero et al. ............ 705/26

OTHER PUBLICATIONS

Buschmann et al., "Pattern-Oriented Software Arthitecture: A System of Patterns," John Wiley & Sons, Ltd., Balfins Lane, England, 1996, XP002330494.

* cited by examiner

METHOD, SYSTEM AND COMPUTER PROGRAM PRODUCT FOR PROVIDING ACCESS POLICIES FOR SERVICES

This application is a national stage application of International Application No. PCT/FI2006/000039 filed on Feb. 8, 2006 and claims priority under 35 U.S.C. 119(e) to U.S. Provisional Application No. 60/651,632 filed on Feb. 11, 2005 and U.S. Provisional Application No. 60/652,741 filed on Feb. 15, 2005, the entire contents of which are hereby incorporated by reference.

FIELD OF THE INVENTION

The present invention relates to provision of subscribers and activation of services in all kind of communications, data and service networks.

The invention is related to a method according to the preamble of claim 1, a system according to the preamble of claim 9 and a computer program product according to the preamble of claim 15.

BACKGROUND OF THE INVENTION

Today's service provider field ranges from start-ups to giants and from broadband to mobile. These operators have diverse requirements. One may be struggling with explosively rising volumes and needs automation, while another may face a saturated market where rapid service introduction is vital to survival.

The number and complexity of available telecom services are increasing every day. Transition towards open standards and all-IP networks allows easier development of new services. At the same time, services, such as VPN or broadband, have added more pressure for operational people because of their impact across different networks and organisational departments.

Service fulfillment is a process for providing customers with their requested services in a timely and correct manner. Due to its deep involvement with the customer, service fulfillment is in the focus of every company. Provisioning plays a key role in the service fulfillment process. Provisioning refers to the creation of subscribers and activation of services into the telecommunications network.

A product-based provisioning solution strengthens the service fulfillment by automating critical parts of it.

Automated provisioning translates into higher productivity, differentiation through perceived end-customer quality and improved competitiveness.

The basic capabilities of provisioning solutions include for instance mobile user provisioning and service activation. Examples of these are provisioning of user and basic and supplementary service information into HLR and authentication centre, and activation of Intelligence Network (IN) and messaging services.

Service provisioning has been described in EP-application 03727535 of the applicant of the present application. In this publication is described a general solution for a provisioning system with a layered software architecture with mountable and dismountable software modules.

The above document, however, is a single user solution for one entity, e.g., one telephone operator.

BRIEF SUMMARY OF THE INVENTION

It is an object of the present invention to overcome at least some of the drawbacks of the above-described techniques and to provide an entirely novel type of method, system and computer program product for a virtual communications, telephone, data or service operator. The main characteristics are, that with the invention:

The service operator can fully use, monitor and configure the provisioning system within the resources allocated for him.

It provides means for network operator to fully control and limit service operators view into provisioned network elements It minimises the load and effort for the network operator to serve and support a service operator.

The goal of the invention is achieved by creating such a provisioning system that enables the host telephone operator to offer provisioning services for a virtual telephone operator. This is provided by representing and utilizing the physical network in many logical segments. Based on this, the invention can differentiate the provisioning access to the network resources per virtual operator. This is implemented by creating authenticated and authorized Application Program Interface (API) for a virtual telephone operator within the host operators provisioning system.

More specifically, the method according to the invention is characterized by what is stated in the characterizing part of claim 1, the system by what is stated in the characterizing part of claim 9, and the computer program product by what is stated in the characterizing part of claim 15.

The solutions described in this document complement these basic capabilities by addressing some of the specific challenges that operators (e.g. mobile, fixed-line, network, service, virtual, etc.) have today.

An invented provisioning solution is a product for subscriber provisioning and service activation. It provides the core processing engines and framework for different OSS/BSS and network interfaces.

An embodiment of the invented solution enables operators to automate the provisioning process from an order entry to billable subscription and services. Reliable automation means improved provisioning consistency and efficiency. Accurate, error-free provisioning ensures that the customers get the correct service without errors and within the agreed delivery schedules.

An embodiment of the invented solution provides new kind of flexibility to the service deployment. Operator can freely configure the logic how the provisioning orders are handled. This means that new provisioning rules or changes to existing rules can be introduced quickly and cost-effectively—without making any major changes to the other OSS/BSS systems (Operations and Business Support Systems).

An embodiment of the invention is a solution for user provisioning and service activation. It strengthens operator's service fulfilment process by automating the technical network service activation tasks and automating the high-volume user provisioning process.

Automated and reliable activation guarantees that customers get the correct service under all circumstances, without errors and within the agreed delivery schedules.

At the same time, the embodiment of the invention provides new type of flexibility for service deployment. Activation tasks for new services can be configured quickly and cost-effectively—without launching major development projects and compromising the competitiveness.

An embodiment of the invention is a novel and inventive version of a well-proven product that has undergone six generations of development to serve operators best in the changing business environment. It implements a single provisioning platform that offers provisioning across different network technologies and OSS/BSS.

An embodiment of the invention is suitable for a wide variety of network domains: 2G, 2.5G, 3G, WLAN, PSTN, ATM, IP, MPLS, xDSL, IN, cable, TETRA and satellite.

An embodiment of the invention can receive provisioning or activation orders from any OSS/BSS, such as customer or order management systems. By providing a single point of access to the network, the embodiment of the invention shields OSS/BSS systems from the complexity and changes of the network layer.

Nowadays there is a possibility for third parties to start operator business without owning the telecommunications network. Depending on the network operators operating country, the government may have opened mobile telecommunications business for competition. The network operators have to offer possibility for service operators to provide same services in their network. These "virtual operators" are hiring the telecommunication network facilities from traditional telecommunication operators.

In prior art solutions these virtual operators have either no connection to provisioning system at all and provisioning requests were managed through OSS/BSS system, for example the network operators customer care system, or the connection to the provisioning system was very limited to simple provisioning requests without any configuration or monitoring capabilities. The both options did mean that serving a service operator, the network operator needed to enhance his own processes, systems and operational personnel meaning that serving service operator was expensive.

Even if virtual operator would own and operate its own provisioning system, the added-value of it is questionable. The network operator cannot allow virtual operator to have direct access to network resources. This would expose all subscriber data for virtual operators, and in worst case violate confidentiality agreements e.g. between network operator and its customers. This means network operator will have to have an authorization and authentication capability for provisioning requests of virtual operator.

On the other hand the start-up work for defining the network elements and the basic configuration is technically a very demanding task.

The invention offers significant benefits.

The system in accordance with the invention typically enables the network operator (host operator) to provide the same provisioning platform for its own and for virtual operator's use. The virtual operator can provision its subscribers through an Application Program Interface (API) according to the invention without troubling to map or configure the actual network elements of the system. The provisioning system offers the virtual operator all the services the host operator (network operator) determines.

By separating the authentication and authorization in the provisioning system is achieved a good security and control over the functions of the service operator. These provide possibility for service operator not only to use the provisioning system, but also to monitor the provisioning process regarding his own provisioning requests and configure his own the provisioning rules.

By positioning the authentication and authorization to different functional program layers a good overall programming order and functionality is achieved.

Definition of the virtual network model gives the network operator possibility to control the view provided to a service operator about the provisioned network. The service operator can have full access to the system within the restrictions defined by the virtual network model. Generation of the virtual network model allows network operator to represent the one physical network in many logical segments. This mechanism enables differentiated provisioning rules and view to network per virtual operator.

An embodiment of the invention activates a wide variety of services for operators—from voice to data, consumer to corporate, single service to packages. The diversity of the embodiment of the invention's operating environments is a proof of its versatility: the embodiment of the invention serves operators with subscriber bases ranging from tens of thousands to tens of millions and with networks varying from a few nodes to complicated multinationals.

The provisioning solution enables a wide range of new opportunities for mobile operators, both network and service (virtual) operators. The following selected benefits can be obtained with some embodiments of the invention and have an instant impact on the operator's business setup.

More Income.

With the provisioning solution, the network operator can sell the provisioning ability as an additional service to the virtual operator. The virtual operator does not need to invest in an own provisioning infrastructure.

Secure and Easy Operation.

Automated features, such as the ability to limit the virtual operators' access to the network elements and the service these provide, make the network operator's role easy. There is no need for extra maintenance staff or additional security investments.

Improved Business Knowledge.

With various reporting and statistics possibilities, the network operator has a comprehensive view of the overall provisioning volumes and split between businesses. The virtual operators have more in-depth understanding of the activation rates and changes in subscriber profiles.

Automated Provisioning—Improves Productivity

Automated provisioning with the embodiment of the invention helps operators to reduce their operational costs and efforts. Zero-touch flow-through provisioning requires only minimum daily operational involvement in tasks such as process monitoring and reporting. Automation reduces manual efforts and improves productivity. Automation also enables better control for OpEx process efficiencies.

Flexible Provisioning—Ensures Competitiveness

An embodiment of the invention provides new type of flexibility to service deployment. The logic how provisioning orders and activation requests are handled is fully configurable by the operator and also by service operator. This means new activation flows or changes to existing flows can be configured quickly and cost-efficiently—without having to launch major development projects for example in Customer Management system.

Flexibility enables operator to react to competition or to make innovative product launches with better control for deployment effort and cost.

High-Performance Provisioning—Reduces Order Backlogs

An embodiment of the invention processes tens of millions of activations per day throughout the world. It has proven its steady performance, both in terms of processing regular production volumes and coping with unexpected variations in demand.

Instant Provisioning—Shorter Lead Times From Order to Billable Service

Automation reduces the 'Order to Ready-to-Bill' cycle from days to minutes, even seconds. An embodiment of the invention provides end-to-end automation and powerful processing engines for provisioning and activating services instantly, even while the customer is waiting.

The sooner the customer starts using the services, the sooner operator starts receiving new revenues.

High-performance provisioning with the provisioning solutions, even during the peak hours and days, helps operators keep their 'Orders Completed on Time-%' rates under control and this way ensures the end-customer loyalty.

The service operators also have direct access into the provisioning system, so the customers of service operator get the services within agreed delivery schedules.

Accurate Provisioning—Raises Perceived End-Customer Quality

Provisioning accuracy reflects to end-customer satisfaction. An embodiment of the invention provides field-proven error-recovery mechanisms, such as automatic connection re-routing, rollback and repair.

Error-free provisioning provides minimised 'Errors During First 30 Days' measure. This enables the operator to differentiate with perceived end-customer quality.

Automated error-recoveries also help to keep master customer data and network in sync and this way minimise the 'stranded asset' effects.

Convergent Provisioning—Reduced CapEx for Operations Support Systems

Convergent provisioning refers to the ability to activate all types of services in all types of networks. This provides significant savings for the operator. For example, activating all consumer and corporate services, such as mobile, ADSL, WLAN access and VPN, with the same provisioning system helps the operator remove lots of costly, unnecessary and overlapping processes.

An embodiment of the invention implements a strategic provisioning platform by providing technology-independent interface layers, configurable provisioning rules and multiple simultaneous processing mechanisms. These enable a single solution across different networks and OSS/BSS.

An embodiment of the invention can be run in convergent multi-service and multi-network environments. This is obvious evidence that operators are already moving towards strategic provisioning to reduce their annual CapEx for OSS.

Future-Proof and Vendor-Independent Provisioning—Anticipates the Future Requirements The modern system architecture of the provisioning solution provides efficient scalability both in terms of performance and functionality.

New functionalities can be introduced with the Service Module concept, which allows that no changes need to be made to the core processing modules. An embodiment of the invention also offers vendor independency by offering a wide range of out-of-box interfaces and enabling new interfaces to be installed in a plug-and-play manner.

Furthermore with the provisioning solution, operator's service fulfilment is not restricted to any specific network, technology or vendor.

BRIEF DESCRIPTION OF THE DRAWINGS

In the following, the invention will be examined in more detail by means of exemplifying embodiments with reference to the attached drawings, in which.

Figure 1:
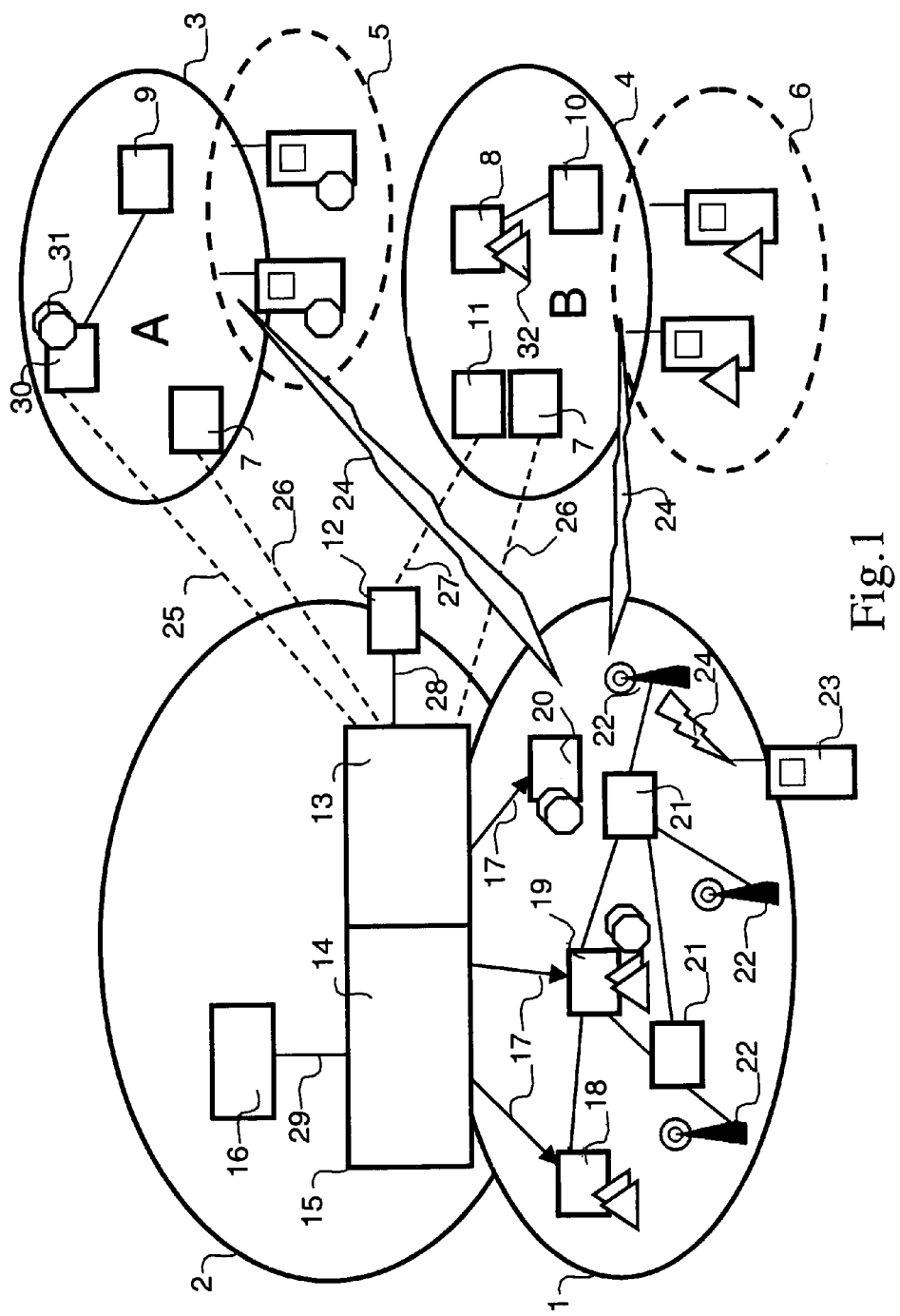
FIG. 1 shows a general block diagram of a system according to the invention.

In the following are listed some features of the invention

Service Abstraction

With an embodiment of the invention, the various communication services are shown to Customer and Order Management systems as abstract requests. The complex rules and operations, such as order de-composition into a set of network- and technology-specific activation tasks, can be hidden from the Customer Management system.

Service abstraction capability enables operator to present the delivered products and product packages similarly everywhere in the service fulfilment process.

Configurable Provisioning Logic

An embodiment of the invention processes a request according to pre-defined provisioning rules. Provisioning rules are presented as graphical workflows in the web user interface of an embodiment of the invention, through which an operator can easily configure them with drag-and-drop method.

Configurability enables sequenced, multi-task provisioning flows together with capabilities such as order de-composition, order enrichment, automated error-recovery rollback and dynamic task generation capabilities.

Multiple Processing Modes

An embodiment of the invention provides multiple simultaneous processing modes. These include, for example, flow-through processing with synchronous, asynchronous or batch mechanisms.

In addition, an embodiment of the invention supports self-service provisioning and provides an optional interactive mechanism, which enables for example operational personnel to manually enrich order data, approve or reject orders and steer the processing flow.

Provisioning Data Formatting

An embodiment of the invention can modify and complement provisioning parameters to a format expected by different target network elements. It is able to do this by fetching parameters from external sources or inheriting them from executed tasks.

An embodiment of the invention also allows manipulation of responses that it creates in response to each executed task. Response manipulation enables, for example, adding operator-specific response codes or conversion of an English error message into a German one.

Request Scheduling and Prioritising

The provisioning solution users can assign execution times for requests to define when they are to be executed. Scheduling can be also done based on network element availability or capacity. By setting priorities operator can define higher-priority orders that may pass lower-priority orders in the execution queues.

Intelligent Network Interfacing

An embodiment of the invention provides network element specific connection and session management. This enables it to seamlessly adjust with different elements of different releases operating in different networks or behind intermediate servers as well as with different interface technologies and loads.

An embodiment of the invention monitors the network task execution closely. It is able to react automatically for example by balancing load, re-trying execution, discovering broken connections, allocating alternative routes and notifying Network Management Systems.

Full Audit Trail

An embodiment of the invention logs all transaction between operator's OSS/BSS systems and network elements, as well as all system functions and configuration operations of individual users. Viewing of logging information is easy through the web user interface.

An embodiment of the invention enables also integration with Alarm or Network Management systems. This way operator can manage the provisioning as part of overall network management.

The service operators will have also full audit trail accessible by them for the requests regarding their provisioning processing.

Fault Tolerance and Online Configuration

The provisioning solution has been designed to be a 24/7/365 system that does not require system shutdown or restart during configuration and maintenance. Processing of provisioning requests is never affected by any other parallel operations, such as system configuration or database cleanup.

Multi-layer queuing mechanism guarantees that the system can seamlessly cope with unexpected variations in demand or network element availability. Provisioning requests can be reprocessed by using a mix of different mechanisms, including both manual and automated.

The provisioning solution can be run on high-availability setup, with options available for single and replicated clusters.

In this document communication means all kind of tele-, data- or other communication in which computer or computers, computer program or computer programs or suchlike logic are used to manage provisioning operations.

In this document provisioning or service provisioning means for example creation, modification, activation and/or deactivation of subscribers, services, service providers, network elements, network devices, business support systems, customer care systems and/or billing systems with computer, computers, computer program, computer programs and/or suchlike logic systems in communication network in any combination mentioned above.

The methods in accordance with the invention are always implemented by software and the systems in accordance with the invention are performed by technical means like single computers or computer systems.

The following definitions are used in connection with the invention:

1 Communications, data or service network.
2 Network resources and management system.
3 Service Operator A.
4 Service Operator B.
5 Subscribers or end-users of service offered by service operator A.
6 Subscribers or end-users of service offered by service operator B.
7 Monitoring, configuring and management of provisioning system 15 within the limits defined by the network operator.
8 Service operator B's 4 customer care system.
9 Service operator A's 3 billing system.
10 Service operator B's 4 billing system.
11 Service operator B's 4 client system for provisioning.
12 Application server.
13 Access, usage, monitoring and configuration unit.
14 Provisioning engine.
15 Provisioning system.
16 Network operator's operation support systems.
17 Tasks to network elements.
18 Network element, e.g. SMSC, MMSC.
19 Network element, e.g. HLR.
20 Network element, e.g. Content server, third party portal.
21 Network element, e.g. MSC.
22 Interface to subscribers or end-users.
23 Subscriber or end-user of network operator.
24 Communication connection, e.g. radio interface.
25 Service operator A's 3 connection for provisioning subscriber, end-user or service using a request.
26 Service operator A's 3 and B's 4 connection for access, monitoring and configuration.
27 Service operator B's 4 connection for provisioning subscriber, end-user or service using a request.
28 Connection between provisioning system 15 and Application server, web server, command line interface server or such like 12.
29 Network operator's connection for provisioning subscriber, end-user or service using a request.
30 Service operator A's 3 client system for provisioning.
31 Service operator A's 3 subscribers or end-users individual identification symbol.
32 Service operator B's 4 subscribers or end-users individual identification symbol.
40 Authentication for Service operator A's provisioning requests and access to provisioning system 15.
41 Limited facilities for Service operator A 3 to provisioning system 15.
43 Authorisation function or authorisation module for Service operator A.
45 Virtual network model used for authorisation rules for Service operator A defined and managed by network operator.
46 Provisioning host for service operator A.
47 Allowed and allocated network resources for service operator A.
48 Monitoring of Service operator A's request processing.
49 Service operator A's 3 request processing configuration for provisioning.
50 Authentication for Service operator B's provisioning requests and access to provisioning system 15.
51 Limited facilities for Service operator B 4 to provisioning system 15.
53 Authorisation function or authorisation module for Service operator B.
55 Virtual network model used for authorisation rules for Service operator B defied and managed by network operator.
56 Provisioning host for service operator B.
57 Allowed and allocated network resources for service operator B.
58 Monitoring of Service operator B's request processing.
59 Service operator B's 4 request processing configuration for provisioning.
65 Physical network model of provisioning system.
66 Provisioning host in the physical network model defines all the connections to the network elements.
67 Network elements, which can be provisioned.
71 Network element interfaces.
72 Network elements (e.g. HLR, SMSC, MMSC, VMS, content servers, etc.)
80 Client system layer
81 Request processing layer
82 Service module layer
83 Task execution layer
91 Database used by provisioning system 15.
93 Graphical User Interface, Management User Interface.
94 Logic execution module and provisioning rules.

According to FIG. 1 communications, data or service network 1 realizes the network services and is owned by network operator. Network resources and management system 2 control and manage the actual communications, data or service network 1 and is owned by network operator.

Service Operator A 3 offers service in network operator's network 1, the service is hired from the network operator.

Service Operator B 4 offers service in network operator's network 1, the service is hired from the network operator. The services offered by the service operator A 3 and B 4 may differ from each other's. The amount of service operators using some embodiment of the invention and connected to network operator is not limited. For clarification in figures there are only two service operators A and B presented.

Subscribers or end-users of service offered by service operator A are referred by number 5 and, correspondingly subscribers or end-users of service operator B are referred by number 6.

Monitoring, configuring and management of provisioning system 15 is performed by element 7 within the limits defined by the network operator. This can be application, web based user interface, command line interface or such like. The block 8 represents service operator B's 4 customer care system. Block 9 represents service operator A's 3 billing system (e.g. prepaid, postpaid, real-time charging). Block 10 represents Service operator B's 4 billing system (e.g. prepaid, postpaid, real-time charging). Block 11 represents Service operator B's 4 client system for provisioning (e.g. application, web based user interface, command line interface or such like). Block 12 is an Application server, web server, command line interface server or such like in Network operators network resource and management system 2 for generating provisioning requests in the provisioning system 15.

Block 13 takes care of Access, usage, monitoring and configuration unit of provisioning system 15 and block 14 is the Provisioning engine of the Provisioning system 15.

Network operator's operation support systems 16 typically include client systems and billing systems.

Arrow 17 stands for tasks to network elements and block 18 for network element, e.g. SMSC, MMSC. Number 19 represents another network element, e.g. HLR of the network operator.

Block 20 is a network element, e.g. Content server, third party portal. Block 21 represents network element, e.g. MSC. Block 22 is an interface to subscribers or end-users, e.g. base station antenna, xDSL connection or such like. Icon 23 stands for a subscriber or end-user of network operator and 24 represents the communication connection, e.g. radio interface between the network operator and the subscriber.

Line 25 is the Service operator A's 3 connection for provisioning subscriber, end-user or service using a request. The request is generated in service operator A's 3 system. Line 26 is Service operator A's 3 and B's 4 connection for access, monitoring and configuration and correspondingly line 27 represents Service operator B's 4 connection for provisioning subscriber, end-user or service using a request. The request is generated in network operator's system.

Line 28 stands for Connection between provisioning system 15 and Application server, web server, command line interface server or such like 12.

Line 29 is Network operator's connection for provisioning subscriber, end-user or service using a request.

Block 30 is Service operator A's 3 client system for provisioning (e.g. CRM, customer care system) and block 31 Service operator A's 3 subscribers or end-users individual identification symbol.

Correspondingly, number 32 stands for Service operator B's 4 subscribers or end-users individual identification symbol.

Figure 2:
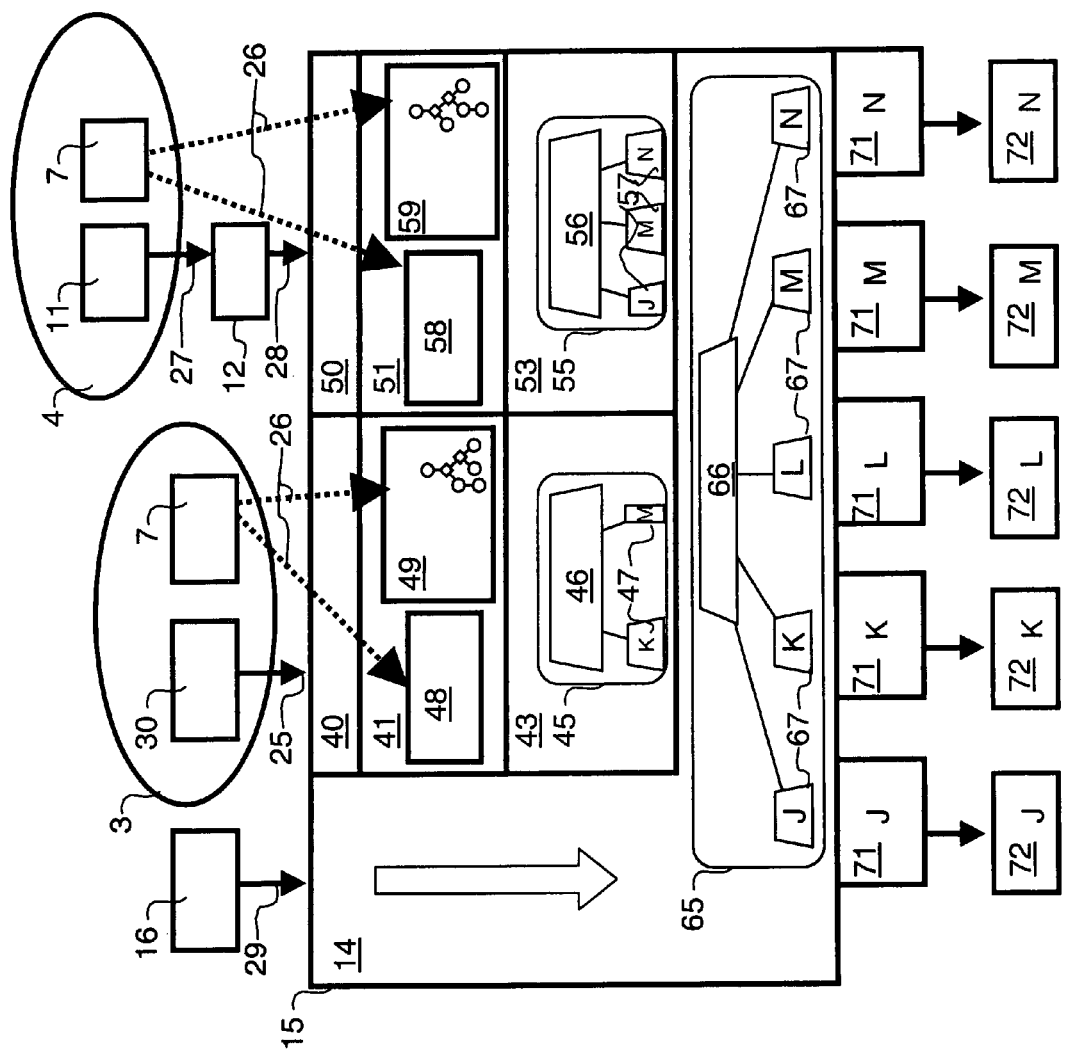
FIG. 2 shows a detailed block diagram of a system of FIG. 1 according to the invention.

According to FIG. 2 block 40 is used for Authentication for Service operator A's provisioning requests and access to provisioning system 15. In block 41 facilities are Limited for Service operator A 3 to provisioning system 15. This contains e.g. request processing rules, monitoring and configuration.

In block 43 is performed the Authorisation function or authorisation module for Service operator A and in block 45 the Virtual network model for authorisation rules for Service operator A 3 are defined and managed by the network operator. Virtual network model 45 is based on the actual network resources defined by network model 65 with the limitations set by the network operator.

Block 46 stands for Provisioning host for service operator A 3. Provisioning host determines limitations to network elements (for example number of simultaneous provisioning connections to the network element from the provisioning host).

Blocks 47 represent allowed and allocated network resources for service operator A 3. Network operator defines and manages network element resource limitations e.g. specified network elements or subscribers within some number range.

Block 48 Monitors Service operator A's request processing. Service operator A can monitor processing of his own requests in the network operators provisioning system.

Block 49 stands for service operator A's 3 request processing configuration for provisioning. Service operator A 3 can configure his own provisioning rules in the network operators provisioning system 15. The provisioning rules can contain for example mapping of a single request into multiple network level resources (service package provisioning) or parameter modifications or use of network resources to populate information into provisioning request.

Block 50 stands for authentication for Service operator B's provisioning requests and access to provisioning system 15 and block 51 represents limited facilities for Service operator B 4 to provisioning system 15. This contains e.g. request processing rules, monitoring and configuration.

In block 53 is performed an authorisation function or authorisation module for Service operator B.

Block 55 is a virtual network model used for authorisation rules for Service operator B 4 defined and managed by network operator. Virtual network model 55 is based on the actual network resources defined by network model 65 with the limitations set by the network operator.

Block 56 is a Provisioning host for service operator B 4. Provisioning host 56 determines limitations to network elements (for example number of simultaneous provisioning connections to the network element from the provisioning host).

Blocks 57 stand for allowed and allocated network resources for service operator B 4. Network operator defines and manages network element resource limitations e.g. specified network elements or subscribers within some number range.

Block 58 takes care of Monitoring of Service operator B's request processing. Service operator B 4 can monitor processing of his own requests in the network operators provisioning system.

Block 59 stands for Service operator B's 4 request processing configuration for provisioning. Service operator B can configure his own provisioning rules in the network operators provisioning system 15. The provisioning rules can contain for example mapping of a single request into multiple network level resources (service package provisioning) or parameter modifications or use of network resources to populate information into provisioning request.

Block 65 is a physical network model of the provisioning system 15. The network model contains information about all network elements provisioned by the provisioning system. This physical network model 65 is managed by network operator.

Block 66 is the provisioning host in the physical network model and defines typically all the connections to the network elements. For example address of the network element in the network, available user IDs and passwords to be used for provisioning, network element interface type 71, etc. to be used for the connection into the network element. This provisioning host 66 is managed by the network operator.

Blocks 67 represent Network elements, which can be provisioned. The network element resources 67 refers to physical network elements 72. These contain information about the properties of network elements, like the number of parallel provisioning connections network element supports, when it can be accessed, how fast it can process provisioning commands, The network element resources 67 are managed by network operator.

Blocks 71 represent network element interfaces connecting the provisioning system 15 with network elements 72 (e.g. HLR, SMSC, MMSC, VMS, content servers, etc.)

The provisioning of network operator's own customers and end-users do not pass the procedure of the service operators' customers and end-users. The network operator's customers and end-users are provisioned straight through to network elements according to physical network model 65.

Figure 3:
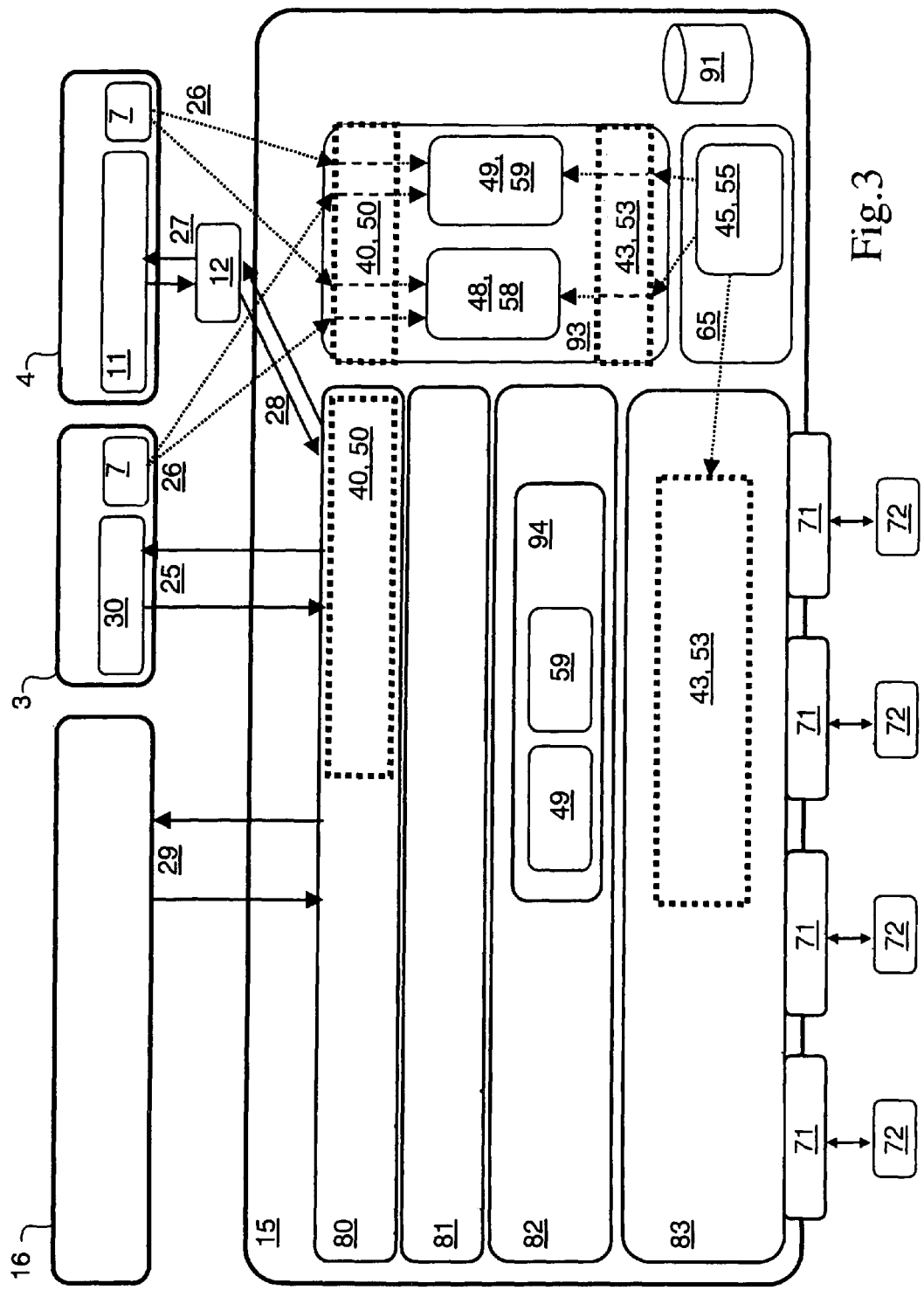
FIG. 3 shows another detailed block diagram of FIG. 1 according to an embodiment of the invention.

According to FIG. 3 the provisioning system is divided to different layers, namely Client system layer 80, Request processing layer 81, Service module layer 82 and Task execution layer 83. Block 91 represents Database used by the provisioning system 15.

Graphical User Interface, Management User Interface 93 is used for monitoring and configuration functions 48, 49, 58, 59 for service operators 3, 4 within the limitations of virtual network model 45, 55 defined by network operator.

Block 94 of service module layer is a Logic execution module and it also takes care of provisioning the rules.

FUNCTIONALITY OF AN EMBODIMENT

This section introduces the key functionalities of the provisioning solution in virtual operator provisioning.

Service operators 3, 4 are allowed to use the provisioning system 15 through authenticated Application Program Interface API, 40, 50, Management User Interface 48, 49, 58, 59, 93 and authorisation function 43, 53 after the provisioning rules processing 94 where the rights for the use of the network elements 18, 19, 20, 21, 72 are controlled by the network operator, whereby the network operator is able to present and utilize one physical network in many logical views, each representing the portion accessible for virtual operator, and in this way controllable by network operator with limitations, authentication and authorization rules. The use means in this application for example sending and receiving requests, configuring and monitoring the system.

Authentication

A virtual operator can connect to the provisioning solution via dedicated, well-defined APIs. When connected to the API, the virtual operator can send orders to provision new subscribers and activate services into the network operators' network and any other system in the infrastructure (for example its own billing and customer management).

The provisioning solution supports differentiated authorisation for the virtual operator's customer management system.

There are four basic API types that the network operator can offer to the virtual operator:

1. Vendor-specific API. The provisioning solution has dozens of out-of-box APIs for the industry's key CRM and Order Management systems.
2. Industry standard technology API, such as SOAP, XML, Java messaging or Corba; or a generic mechanism, such as synchronous, database pull or batch.
3. Proprietary API. Socket-based API which offers simple parameter name, parameter value, message format for information exchange.
4. Human interface for provisioning request generation. The interface can be for example web based, in case virtual operator does not have machine to machine connection into provisioning system.

API is formed e.g, by blocks 12 and 13 (Application server and 13 Access, usage, monitoring and configuration unit) of FIG. 1 or blocks 40 and 50 of blocks FIGS. 2 and 3.

It is possible to define which network elements the virtual operator can access. Furthermore, it is possible to define the time window when the target network elements are accessible by the virtual operator. Moreover, it is possible to define the services that the virtual operator can activate and configure in the network elements. Finally, it is also possible to define the number ranges (based e.g. on MSISDN or IMSI) that the virtual operator is allowed to manage.

The provisioning solution has user name and password authentication for the virtual operators' systems. The provisioning solution provides a number of security features valuable also for virtual operators.

In an embodiment of the invention Operation&Management (O&M) Graphical User Interface (GUI) provides configurable user profiles, which enable the network operator to strictly limit the O&M functions available for the virtual operator (for example, only provisioning request monitoring).

All user name and password combinations are encrypted and hidden from the log files and O&M GUI.

The virtual operator's provisioning activity can take place over a secure connection to the network element (e.g. SSH).

The provisioning solution enables differentiated processing rules and priorities for the virtual and network operators' provisioning requests.

The network operator can set ahead-of-queue priority for its own provisioning activity.

Different types of requests may have different priorities. For example virtual operator's call centre initiated displays (showing, for example, subscriber status in the network element) may have higher priority than normal flow-through traffic.

In an embodiment of the invention the solution enables detailed step-by-step configuration of the virtual operator's provisioning logic.

In an embodiment of the invention the solution enables the virtual operator's provisioning requests to be processed also in batches.

Connectivity and session management can be specified per virtual operator. Most of the parameters are very likely to be same across all parties, but in case e.g. internal SLAs etc., network operator can differentiate for example the connection priority to logical network elements, so that logical segment of element accessible to one virtual operator has different priority than the one accessible to another.

The invention allows network operator to easily shut down traffic stream from a certain virtual operator by locking the connection(s) to logical network element(s).

The network operator can offer various reports and monitoring views to the virtual operator, such as the number of overall provisioning requests basic processing statistics (the numbers of failed and succeeded requests)

the number of executed tasks for each network element the average execution time for provisioning requests.

ARCHITECTURE OF AN EMBODIMENT

In an embodiment of the invention the solution implements a modern and scalable system architecture. The system consists of four layers—Client System Layer 80, Request Processing Layer 81, Service Module Layer 82 and Task Execution Layer 83—together with interfaces and System Management components.

Client System Layer 80

In an embodiment of the invention the Client System Layer 80 serves as an interface towards OSS/BSS systems and manages connections to them. The layer manages transaction to the both directions: it captures and validates provisioning requests from the OSS/BSS systems to the provisioning solution and sends responses to them.

Request Processing Layer 81

In an embodiment of the invention the Request Processing Layer forwards the provisioning requests in the correct order and at configured times to the other system layers. It does this on the basis of the requests' arrival times, desired execution order and prioritising rules. The layer is able to make sure that there is always only one request under execution at a time for each subscriber.

Service Module Layer 82

Service Module Layer consists of service modules. The service modules allow an operator, for example, to define rules for provisioning logics and enable functions such as rollback and routing.

Task Execution Layer 83

After a request has undergone all the required processes, a set of executable tasks is created as a result. Task Execution Layer manages the execution of the tasks in the network elements. It communicates with the network elements through specified network element interface modules and directs the tasks to them in the correct formats.

The provisioning solution prepares a response as soon as a task has been executed in the network. The response informs the OSS/BSS systems that the request has reached its final state.

System Management Components 93

System Management components contain a description of the telecommunications management network where the provisioning solution operates. The description provides information related to network elements, such as version management, connection specific settings and transport protocols.

The components also include authorisation and authentication data, for example user names, passwords and user profiles. This information also contains restrictions and limitations for service operators.

Interfaces 71

The communication between the provisioning solution and client OSS/BSS or target network element is independent of protocols, vendors and technologies.

The technologies used in the communication with external systems include, for example, MML, XML, SOAP, SQL, LDAP, Telnet, SSH, X.25, HTTP, Java RMI, CMISE/Q3, Corba IIOP and proprietary C libraries. In many cases, a proprietary network element specific data schema has to be used in order to fulfil the activation tasks.

In addition to network element and OSS/BSS interfaces, the provisioning solution can contain interface modules to external resources. The modules can fetch for example activation task parameters from external databases, update network inventory after element configuration or inform Alarm and Network Management Systems in case of activation failures.

Service modules

The modular architecture of the provisioning solution supports add-on service modules, which complement the provisioning solution core functionality. All service modules are accessible via the web-based user interface of the provisioning solution.

Logic execution module 94 and provisioning rules 49, 59

Logic execution module is an integral part of the provisioning solution.

One provisioning or activation work order typically requires multiple tasks to be executed across different network elements and OSS/BSS systems. Each of these tasks usually consists of multiple configuration commands.

The Logic execution module hides this provisioning-related logic from the systems managing customers and service orders. These customer-facing systems can ask the provisioning platform to create new subscribers or activate services into network by using simple business-level orders. The rules how these orders are de-composed into technical network tasks are configured with Logic execution module.

Logic execution module enables de-composition of a provisioning order into multiple tasks based on pre-configured rules and data elements in the order. This means the Logic execution module allows activation of multi-service products based on a single high-level order. Logic execution module also minimises the change impact on other OSS/BSS systems when creating new services or implementing changes to existing ones.

Logic execution module offers an easy-to-use front-end for creating and managing provisioning logics. It provides a graphical web-based user interface, which allows configuration of different rules and flows by using simple point-and-click and drag-and-drop tools.

Configurable provisioning logic also introduces additional intelligence into provisioning. Logic execution module supports dynamic decision-making and is able to decide which operations to apply in each provisioning case on the basis of the request in question and the execution results of prior tasks. Logic execution module allows configurations whether tasks belonging to the same request are executed sequentially or concurrently. It also provides support for queries and updates against external databases.

One key application of configurable provisioning logic is automated error-recovery rollback. Rollback allows you to define that if a specific task fails, reverse operations are performed on the preceding, already executed tasks.

With rollback error-recovery routines, the request does not remain partially executed in the network and the executed tasks need not be deleted manually from the network elements.

Logic execution module enables operators to raise the strategic value of the provisioning platform. With the ability to run different provisioning rules in parallel, an operator can consolidate overlapping provisioning systems into the more strategic, multi-network solution.

Front-End for Provisioning Request Generation 12

In case service provider does not have possibilities to use direct machine to machine provisioning connection, the solution can be enhanced with provisioning front-end, which can be used to provide tools to generate provisioning requests manually. The provisioning front-end provides web based user interface, which service operator can use to invoke provisioning operations (provisioning requests) into provisioning system.

The provisioning front-end supports creating, modifying and deleting subscriber and service information of a virtual operator. Provisioning Client also supports displaying of subscriber data in the network. The provisioning operations can be restricted and defined by the network operator.

System Architecture and Architectural Layers

The provisioning system contains four layers; client system layer 80, request processing layer 81, service module layer 82 and task execution layer 83.

The client system layer 80 is responsible to receive service requests (25-28) from the client systems 3, 4, 16, converts request into systems internal format and stores them into database 91. When the request has been executed and it has a final status, the client system 3, 4, 16 delivers a response to the client system 3, 4, 16.

The request processing 81 layer has the basic request processing functionality common to all provisioning product installations. It manages the correct execution order of the received service requests, handles the priorities so that service requests with higher priority may bypass requests with lower priority. If a service request is timed, the request processing layer takes care that the request will be executed in the correct time.

The service module layer 82 manages the service modules. Modules can be installed dynamically into the system and also removed dynamically. The core of the product has rules how requests are executed through installed service modules. Service Module Layer 82 receives requests from Request Processing Layer 81, sends network element specific operations (tasks) to Task Execution Layer 83, receives responses to tasks from it and sends the finalized request responses back to Request Processing Layer 81.

The task execution layer manages the connections to the network elements 72 and uses network element specific network element interfaces 71 (NEI) to execute tasks (network element specific service operations) into a network element 72. The network element interface 71 converts the order into a format network elements 72 understand it and provides a response to the executed task.

Service Module Layer 82 receives requests from Request Processing Layer 81, sends network element specific operations (tasks) to Task Execution Layer 83, receives responses to tasks from it and sends the finalized request responses back to Request Processing Layer 81.

The MVNOs (Mobile Virtual Network Operator, service operator) can basically be served with similar way as network operators (host operator) own systems. Each MVNO may have a Customer Care system, which is capable to connect into provisioning system through a computer to computer interface (such as Comptel Extended API). The Customer Care of MVNO has to have a valid user id and pass word in order to log into provisioning system. The only additional functionality has been authorisation rules in the client system layer. The network operator can define in this solution to which network elements provisioning requests may be directed to (network element identifier in the request message) and additionally what ranges of users MVNO may provision (e.g. IMSI number range) and what operations MVNO may carry out (e.g. display, delete, create).

This solution works fine as long as the provisioning requests can be directly pointed to a single physical network element in the network layer the provisioning system is provisioning.

But when intelligence is added into provisioning system (e.g. provisioning logic), the client system layer is not capable to decide to which network elements operation is targeted. For example, the request can only contain high level service description and this service description is mapped into network tasks inside the system right before the network layer. Therefore authorisation can not be made on the client system layer in more complex provisioning systems.

In the simplest solution according to the invention the provisioning logic was used for authorisation. But this solution works only as long as there are only a couple of service descriptions and the rules are simple. When more and more service descriptions are defined for MVNO, the network operator needs more and more resources to define all the service descriptions for MVNO and solve the possible problems MVNO has in daily provisioning operations (e.g. subscriber already exists in the network element). This means increasing costs for network operator in order to support multiple service operators, who have complex business processing rules. The invention solves this by providing multi-user support for managing provisioning logic. Network operator can allow virtual operator to manage it's own provisioning logic.

According to one preferred embodiment of the invention authorisation is performed after the provisioning rules processing and request processing functions. In other words it is for example provided a separated authorisation layer after the processing of provisioning logic. Authorisation can be done in e.g. authorisation module, authorisation function or network element interfaces. Based on the physical network model, a virtual model is defined for MVNO and it can contain information about all network elements the MVNO may access and also the limitations per network element (e.g. range of subscribers, set of services, set of profiles).

Since the network operator does not want to, for example solve possible error situations happening in the provisioning chain of MVNO, there is also need to provide access for administrators of MVNO into provisioning system. With the partial/virtual network model, the visibility offered to MVNO could be limited into secured playground—only network elements, system statistics and requests/tasks regarding the MVNO would be presented to the administrator of MVNO. Also provisioning logic regarding to the MVNO could be accessed and modified by the service developer of MVNO, so there would be no need for network operator to focus on the technical details of services MVNO offers to mobile subscribers or the daily operations MVNO performs.

The invention claimed is:

1. A method for provisioning in a telecommunications network, the method comprising the steps of:
   receiving at least one request, from a requesting client system through an Application Program Interface, for defining measures relating to customers, services, or network elements in the telecommunications network;
   processing each request in functional layers of a provisioning system hosted by a network operator, where at least one functional layer includes independently mountable and dismountable functional modules;
   executing tasks in the telecommunications network according to the results of the processing step; and
   reporting the results to the requesting client system, wherein
   multiple telephone operators are allowed to use the provisioning system through an authenticated Application Program Interface, a Management User Interface, and an authorisation function module after provisioning rules are processed, where telephone operator's rights for use of network elements are controlled by the network operator, and
   the network operator is able to present and utilize one physical telecommunications network in many logical views, each view representing the network elements accessible to a telephone operator, and in this way controllable by the network operator with limitations, authentication and authorization rules.

2. A method according to claim 1, wherein authentication and authorisation are performed separately in different functional layers.

3. A method according to claim 1 or 2, wherein authorization is performed after authentication and request processing functions.

4. A method according to claim 3, wherein authorization is performed in an authorization module or network element interface.

5. A method according to claim 1, further comprising creating a virtual model of enabled network elements for a service operator.

6. A method according to claim 1, wherein service layer functionality is performed by functional modules.

7. A method according to claim 1, wherein the functional layers include a client system layer, a request processing layer, a service module layer, and a task execution layer.

8. A system for provisioning in a telecommunications network, the system comprising:
   means for receiving at least one request from a requesting client system through an Application Program Interface for defining measures relating to customers, services, or network elements;
   means for processing each request in functional layers of a provisioning system hosted by a network operator, where at least one layer includes independently mountable and dismountable functional modules;
   means for executing tasks in the telecommunications network according to the results of the processing step; and
   means for reporting the results to the requesting client system;
   means for allowing multiple telephone operators to use the provisioning system through an authenticated Application Program Interface, a Management User Interface, and an authorisation function module, after provisioning rules are processed and
   means for controlling each telephone operator's rights for use of network elements by the network operator, whereby the network operator is able to present and utilize one physical telecommunications network in many logical views, each view representing the network elements accessible to a telephone operator, and in this way controllable by the network operator with limitations, authentication and authorization rules.

9. A system according to claim 8, wherein authentication and authorization are performed separately in different functional layers.

10. A system according to claim 8 or 9, wherein authorisation is performed after authentication and request processing functions.

11. A system according to claim 8, wherein authorisation is performed in a different step after authentication or network element interface.

12. A system according to claim 8, further comprising means for creating for the service operator a virtual model of enabled network elements.

13. A non-transitory computer readable medium having stored thereon computer executable code for provisioning in a telecommunications network, the executable code causing one or more processor to perform the step of:
   receiving at least one request from a requesting client system through an Application Program Interface for defining measures relating to customers, services, or network elements;
   processing each request in functional layers of a provisioning system hosted by a network operator, where at least one functional layer includes independently mountable and dismountable functional computer readable program code modules;
   executing tasks in the telecommunications network according to the results of the processing step; and
   reporting results to the requesting client system, wherein
   multiple telephone operators are allowed to use the provisioning system through an authenticated Application Program Interface, a Management User Interface, and an authorisation function module after provisioning rules are processed, and
   telephone operator rights for use of network elements are controlled by the network operator, whereby the network operator is able to present and utilize one physical telecommunications network in many logical views, each view representing the network elements accessible to a telephone operator, and in this way controllable by the network operator with limitations, authentication and authorization rules.

14. A non-transitory computer readable medium according to claim 13, wherein authentication and authorization are performed separately in different functional layers.

15. A non-transitory computer readable medium according to claim 13 or 14, wherein authorization is performed after authentication.

16. A non-transitory computer readable medium according to claim 15, wherein authorization is performed in service module layer.

17. A non-transitory computer readable medium according to claim 13, wherein a virtual model of enabled network elements is created for a service operator.

18. A non-transitory computer readable medium according to claim 13, wherein functions of a service module layer are performed by functional modules.

19. A non-transitory computer readable medium according to claim 13, wherein the functional layers includes in a client system layer, a request processing layer, a service module layer, and a task execution layer.

* * * * *